United States Patent [19]
Seki et al.

[11] Patent Number: 5,305,228
[45] Date of Patent: Apr. 19, 1994

[54] TOOL AXIS DIRECTION CALCULATION METHOD

[75] Inventors: Masaki Seki, Suginami; Osamu Hanaoka, Minamitsuru, both of Japan

[73] Assignee: Fanuc, Ltd., Yamanashi, Japan

[21] Appl. No.: 838,732

[22] PCT Filed: Jul. 24, 1991

[86] PCT No.: PCT/JP91/00996

§ 371 Date: Mar. 16, 1992

§ 102(e) Date: Mar. 16, 1992

[87] PCT Pub. No.: WO92/02869

PCT Pub. Date: Feb. 20, 1992

[30] Foreign Application Priority Data

Sep. 8, 1990 [JP] Japan .................... 2-210989

[51] Int. Cl.$^5$ .............................................. G05B 19/18
[52] U.S. Cl. ........................... 364/474.29; 364/474.18; 318/572
[58] Field of Search ............... 364/474.18, 474.28, 364/474.29; 318/572

[56] References Cited

U.S. PATENT DOCUMENTS 4,559,601 12/1985 Kishi et al. ................ 364/474.29
4,559,606 12/1985 Jezo et al. .
5,070,464 12/1991 Seki et al. ................ 364/474.29

FOREIGN PATENT DOCUMENTS 57-166606 10/1982 Japan .
60-118451 6/1985 Japan .
63-257805 10/1988 Japan .

*Primary Examiner*—Long T. Nguyen
*Assistant Examiner*—Steven R. Garland
*Attorney, Agent, or Firm*—Staas & Halsey

[57] ABSTRACT

A tool axis direction calculation method for determining a direction vector of the tool axis when a side is cut be a 5-axes numerically controlled machine tool. A normal vector (Ri) is determined at a dividing point (Pi) of the upper surface of a sculptured surface, and a normal vector (Si) is determined at a dividing point (Qi) of the lower surface thereof. Next, an intermediate vector (Ni) having a direction between the normal vector (Ri) and the normal vector (Si) and a size equal to the radius of a tool is determined. Offset points (Xi, Yi) are determined from the intermediate vector (Ni), and a vector (Zi) connecting the offset points (Xi, Yi) is determined as the direction vector of the tool axis. A direction vector of the tool axis closest to a generating line can be obtained, and thus a side closest to a desired sculptured surface can be cut.

3 Claims, 3 Drawing Sheets

TOOL AXIS DIRECTION CALCULATION METHOD

BACKGROUND OF THE INVENTION

1. Field of the Invention

The present invention relates to a tool axis direction calculation method used in an automatic programming apparatus for creating NC data (machining program) for cutting a sculptured surface of a metal mold, and more specifically, to a tool axis direction calculation method of determining a direction vector of a tool axis in a side cut carried out by a 5-axes numerically controlled machine tool.

2. Description of the Related Art

Automatic programming apparatuses for creating NC data for cutting a sculptured surface of a metal mold are provided with a software for creating various NC data, and this software can simultaneously determine offset data for a tool.

Also, 5-axes numerically controlled machine tools having B- and C-axes for inclining a tool axis in addition to the usual X-, Y- and Z-axes, are available and can cut a side of a workpiece by using a flat end mill.

When making this side cut, a direction vector of a tool axis is generally determined by the following calculation method:

(a) determining dividing points corresponding to the upper and lower surfaces of a curved surface to be cut;

(b) determining respective normal vectors at these dividing points;

(c) determining points obtained by offsetting the radius of a tool to the directions of the respective normal vectors; and (d) creating a vector by connecting these points and using the thus created vector as the direction vector of the tool axis.

Nevertheless, this method has the following drawbacks:

First, the direction of the normal vector of the upper surface of a curved surface to be cut does not always coincide with the direction of the normal vector of the lower surface thereof, and thus the direction vector of a tool axis may not be parallel to the generating line of the curved surface and may be twisted.

Second, the tool axis may not be on the line segment (generating line of the curved surface) obtained by connecting the points corresponding to the upper and lower surfaces, respectively, of the curved surface to be cut. More specifically, the tool axis is on the generating line only when the normal vector of the upper surface is equal to the normal vector of the lower surface.

As a result, a sculptured surface to be determined is different from an actual machined surface, i.e., a workpiece is bittin or partially not cut.

SUMMARY OF THE INVENTION

Taking the above into consideration, an object of the present invention is to provide a tool axis direction calculation method of determining the direction vector of a tool axis by which a machining surface can be made closer to a generating line.

To attain the above object, according to the present invention, there is provided a tool axis direction calculation method of determining a direction vector of the tool axis when a side is cut by a 5-axes numerically controlled machine tool, which comprises the steps of determining a first normal vector at a first dividing point of the upper surface of a curved surface, determining a second normal vector at a second dividing point of the lower surface of said curved surface, determining an intermediate vector having a direction between said first normal vector and said second normal vector and a size equal to the radius of a tool, determining a first offset point from said first dividing point and said intermediate vector, determining a second offset point from said second dividing point and said intermediate vector, and determining a vector connecting said first offset point and said second offset point as said direction vector of said tool axis.

When a normal vector of an upper surface is different from a normal vector of a lower surface, the direction vector of a tool axis does not coincide with a generating line. Therefore, an intermediate vector located between the normal vector of the upper surface and the normal vector of the lower surface is determined, and the direction vector of the tool axis is determined from the intermediate vector, whereby a direction vector of the tool axis is determined by which a machining surface can be made closer to a generating line.

DETAILED DESCRIPTION OF THE PREFERRED EMBODIMENTS

An embodiment of the present invention will be described below with reference to the drawings.

Figure 1:
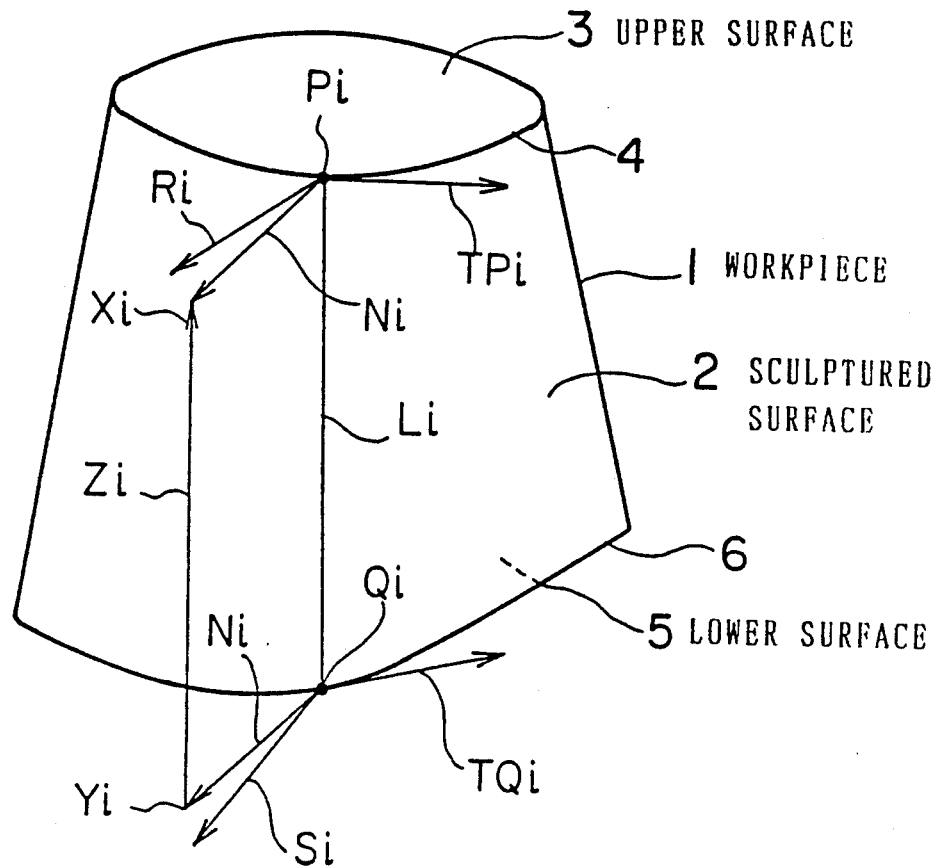
FIG. 1 is a diagram showing an example of a workpiece having a sculptured surface, for explaining a tool axis direction calculation method according to the present invention.

FIG. 1 is a diagram showing an example of a workpiece having a sculptured surface, for explaining a tool axis direction calculation method according to the present invention, wherein a workpiece 1 has a sculptured surface 2, a curved line 4 formed by an upper surface 3 and the sculptured surface 2, and a curved line 6 formed by a lower surface and the sculptured surface 2.

Hence, the direction vector of a tool axis need only be parallel with the generating line Li formed on the sculptured surface made by connecting an i-th dividing point Pi on the curved line 4 and an i-th dividing point Qi on the curved line 6. Note that a normal vector Ri is determined as the outer product of a tangent vector TPi and the generating line Li. A normal vector Si is also determined as the outer product of a tangent vector TQi and the generating line Li.

In general, however, the direction of the normal vector Ri at the dividing point Pi does not coincide with the direction of the normal vector Si at the dividing point Qi. Therefore, even if a tool axis vector is created from the normal vectors Ri and Si, the direction vector of a tool axis parallel to the generating line Li cannot be obtained.

To cope with this problem, according to the present invention, an intermediate vector Ni located between the normal vector Ri and the normal vector Si is determined. Namely, a point obtained by extending an intermediate vector Ni from the dividing point Pi is assumed to be an offset point Xi, and a point obtained by extending an intermediate vector Ni from the dividing point Qi is assumed to be an offset point Yi. A vector obtained by connecting the offset point Xi and offset point Yi is assumed to be Zi, which is used as the direction vector of the tool axis. Accordingly, a direction vector more parallel to the generating line Li can be obtained.

A first method of determining the intermediate vector Ni is to obtain the arithmetic mean of the normal vector Ri and normal vector Si.

Further, as a second method, the intermediate vector Ni can be obtained by the following formula, $$Ni=(1-k) Ri+kSi$$

where k is a distribution ratio previously given as a parameter and $0 \leq k \leq 1$. When the distribution ratio k is smaller, the intermediate vector approaches the normal vector Ri, and as the distribution ratio k becomes larger, the intermediate vector approaches the normal vector Si. The distribution ratio k is set as the parameter by a user, by determining which normal vector is preferably located closest to the intermediate vector. When the distribution ratio k is not set, an arithmetic mean is used.

Data constituting the sculptured surface 2 can be obtained by processing a language created by an automatic programming, or by data input through an interactive mode with a curved surface creation module or the like. Therefore, the calculation for determining the direction vector of the tool axis according to the present invention is processes by a prepost processor. The thus-obtained result is supplied to a post processor to create a final NC data, i.e., a machining program composed of an NC language.

Figure 2:
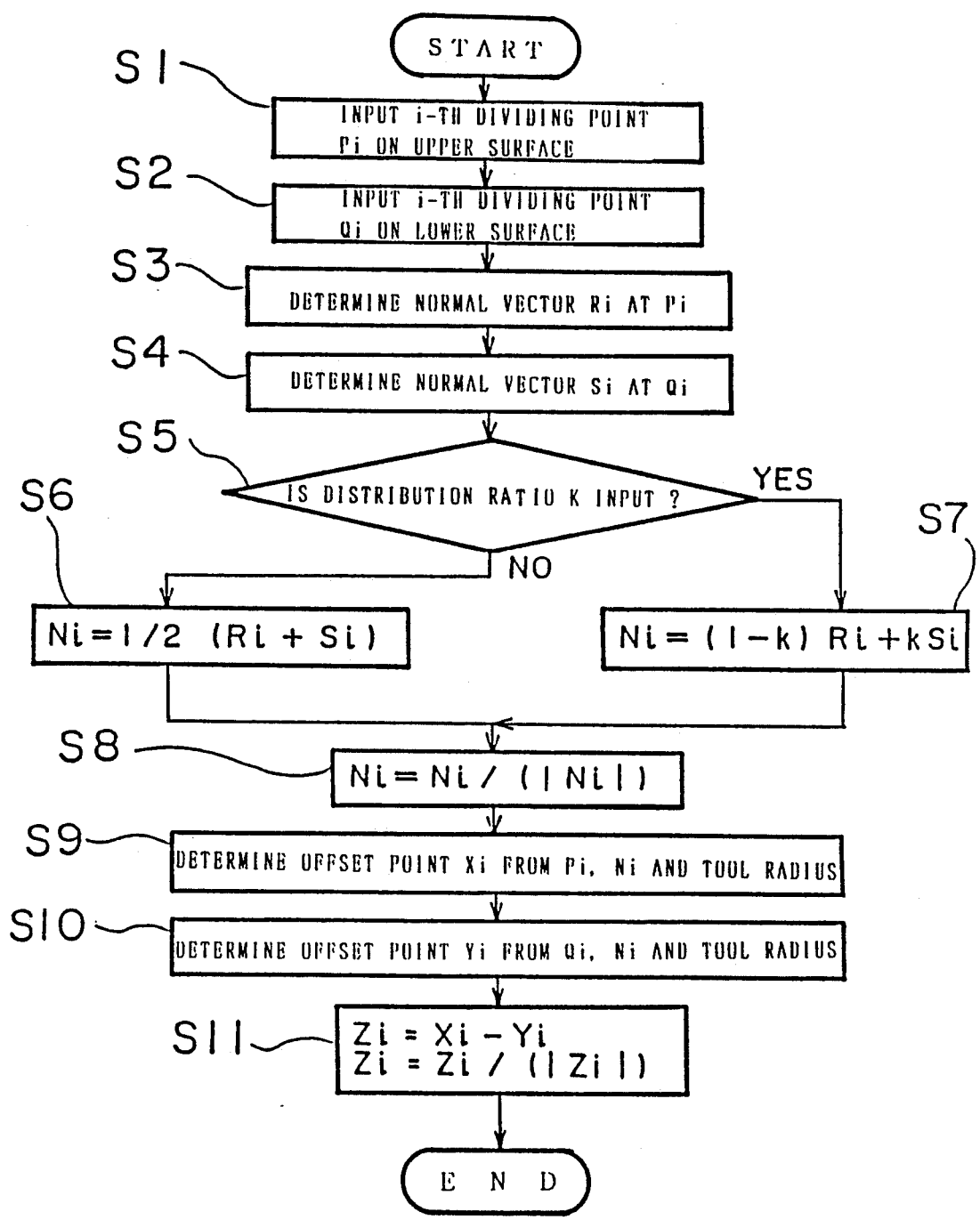
FIG. 2 is a flowchart of the processing effected by the tool axis direction calculation method according to the present invention.

FIG. 2 is a flowchart of the processing effected by the tool axis direction calculation method according to the present invention, wherein numerals prefixed with an "S" indicate the numbers of steps of the process and these steps are processed by the processor of an automatic programming apparatus to be described later:

[S1] the i-th dividing point Pi on the upper surface 3 is input;

[S2] the i-th dividing point Qi on the lower surface 5 is input; note that the data input at steps S1 and S2 is processed by the curved surface creation module;

[S3] the normal vector Ri at the dividing point Pi is determined to be the outer product of the tangent vector TPi and the generating line Li;

[S4] the normal vector Si at the dividing point Qi is determined to be the outer product of the tangent vector TQi and the generating line Li;

[S5] it is determined whether or not the distribution ratio k is input, and when input, the process goes to step S7, and when not input, the process goes to step S6;

[S6] since the distribution ratio k is not input, the arithmetic means of the normal vectors Ri and Si is determined as the intermediate vector Ni;

[S7] since the distribution ratio k is input, the intermediate vector Ni is determined by using the aforesaid formula $Ni=(1-k) Ri+kSi$;

[S8] the intermediate vector Ni is normalized by being divided by an absolute value;

[S9] the offset point Xi is determined from the dividing point Pi and intermediate vector Ni;

[S10] the offset point Yi is determined from the dividing point Qi and intermediate vector Ni; and

[S11] the direction vector of the tool axis Zi is determined by determining the vector Zi connecting the offset points Xi and Yi and further normalizing the vector Zi.

As a result, even if the normal vector of the upper surface does not coincide with the normal vector of the lower surface, a curved surface closer to a sculptured surface can be machined by determining the direction vector of the tool axis as described above.

Figure 3:
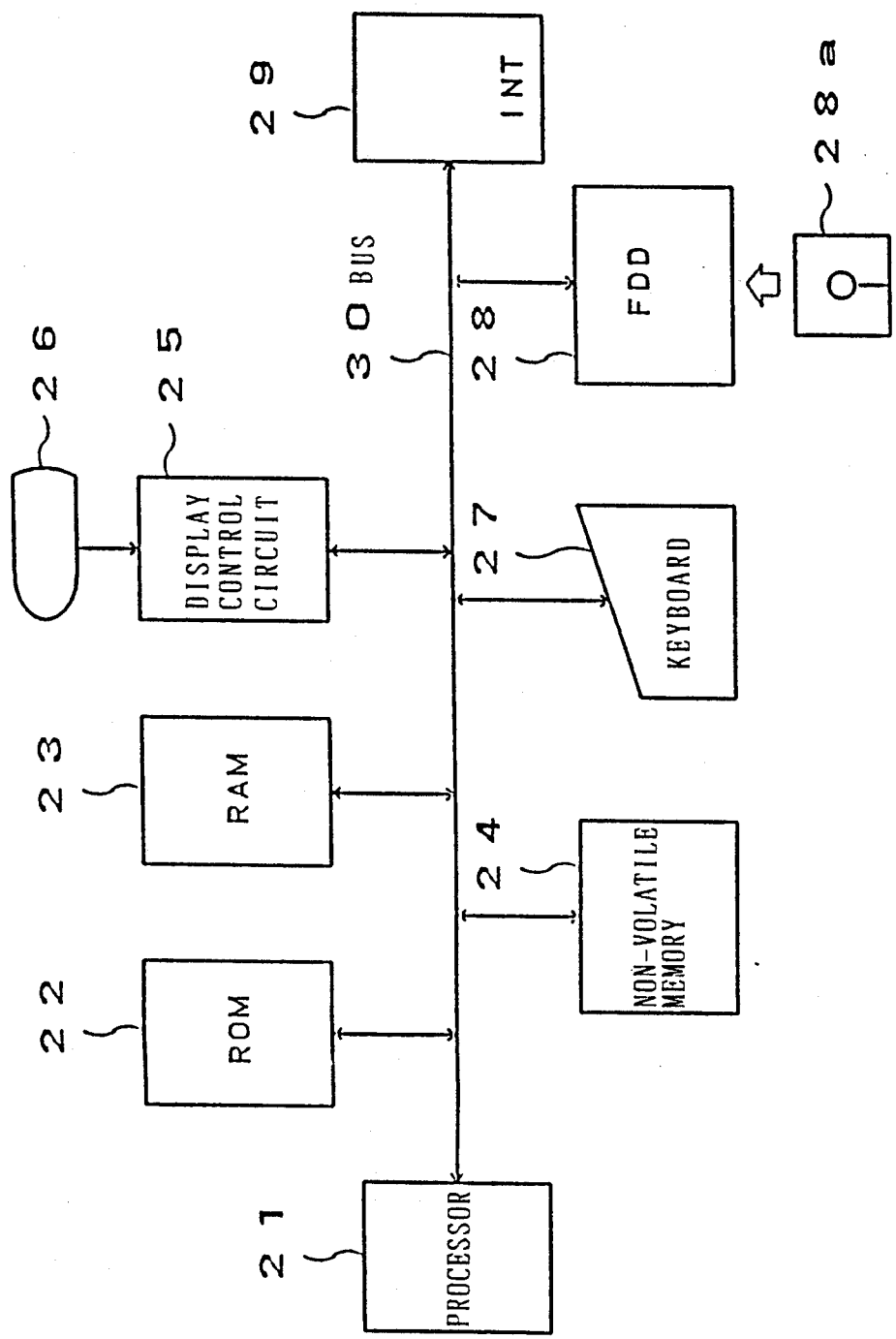
FIG. 3 shows a block diagram of hardware of an automatic programming apparatus embodying the present invention.

FIG. 3 shows a block diagram of hardware of an automatic programming apparatus embodying the present invention, wherein a processor 21 controls the automatic programming apparatus as a whole. A system program is stored in a ROM 22 and the processor 21 determines the aforesaid direction vector Zi of the tool axis in accordance with the system program. Intermediate data necessary for determining the direction vector Zi of the tool axis is stored in a RAM 23. A non-volatile memory 24 stores parameters such as the distribution ratio k and the like, which must be maintained operative even after a power supply is cut off, and thus is supplied with a back-up power source such as a battery.

A display control circuit 25 converts the data stored in the RAM 23 to a display signal, which is supplied to a display unit 26 and displayed thereat. A CRT, liquid crystal display or the like is used as the display unit 26.

A keyboard 27 is composed of software keys, function keys having predetermined functions, and operation keys composed of numeric keys and alphabet keys.

A floppy disk drive 28 sequentially writes created NC data (machining program) to a floppy disk 28a. Further, the created NC data may be printed-out to an externally connected printer or the like through an interface 29. These elements are interconnected to a bus 30, respectively.

As described above, according to the present invention, since an intermediate vector is determined from a normal vector of an upper surface and a normal vector of a lower surface, and the direction vector of a tool axis is determined from the intermediate vector, even if the direction of the normal vector of the upper surface is different from the direction of the normal vector of the lower surface, a direction vector of the tool axis closest to a generating line can be obtained, and as a result, a side cut closest to a desired sculptured surface can be carried out.

We claim:

1. A tool axis direction calculation method for determining a direction vector of a tool axis when a side of a workpiece is cut by a 5-axes numerically controlled machine tool, comprising the steps of:

determining a first normal vector at a first dividing point located between an upper surface and a curved surface of said workpiece;

determining a second normal vector at a second dividing point located between a lower surface and said curved surface of said workpiece;

determining an intermediate vector having a direction between said first normal vector and said second normal vector and a size equal to a radius of a tool;

determining a first offset point from said first dividing point and said intermediate vector;

determining a second offset point from said second dividing point and said intermediate vector;

determining a vector connecting said first offset point and said second offset point to be said direction vector of said tool axis; and using said direction vector of said tool axis by said 5-axes numerically controlled machine tool.

2. A tool axis direction calculation method according to claim 1, wherein said intermediate vector is determined as the arithmetic mean of said first normal vector and said second normal vector.

3. A tool axis direction calculation method according to claim 1, wherein said intermediate vector is determined by a formula $$Ni = (1-k)Ri + kSi$$

where Ni is said intermediate vector, k is a distribution ratio previously given as a parameter, Ri is a first normal vector, and Si is a second normal vector.

* * * * *